US012800721B2

(12) United States Patent
Lee

(10) Patent No.: US 12,800,721 B2
(45) Date of Patent: Nov. 17, 2026

(54) METHOD AND SYSTEM FOR ESTIMATING RELIABILITY OF BOUNDING POINT OF TRACK

(71) Applicants: HYUNDAI MOTOR COMPANY, Seoul (KR); KIA CORPORATION, Seoul (KR)

(72) Inventor: Woo Young Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 481 days.

(21) Appl. No.: 18/227,568

(22) Filed: Jul. 28, 2023

(65) Prior Publication Data

US 2024/0085527 A1 Mar. 14, 2024

(30) Foreign Application Priority Data

Sep. 14, 2022 (KR) ........................ 10-2022-0115447

(51) Int. Cl.
*G01S 7/00* (2006.01)
*G01S 7/48* (2006.01)

(52) U.S. Cl.
CPC .................................. *G01S 7/4808* (2013.01)

(58) Field of Classification Search
CPC ...... G01S 7/4808; G01S 13/865; G01S 17/42; G01S 17/86; G01S 17/89; G01S 17/931; G06T 7/70; G06T 7/11; G06T 7/60; G06T 2210/12
See application file for complete search history.

(56) References Cited

U.S. PATENT DOCUMENTS

| | | | | |
|---|---|---|---|---|
| 10,466,361 | B2 * | 11/2019 | Lee | G01S 5/0263 |
| 10,699,563 | B1 * | 6/2020 | Oron | G01S 7/4808 |
| 12,026,956 | B1 * | 7/2024 | Purdy | B60W 60/0015 |
| 2019/0096086 | A1 * | 3/2019 | Xu | G01S 7/417 |
| 2019/0265714 | A1 * | 8/2019 | Ball | G05D 1/024 |
| 2019/0340775 | A1 * | 11/2019 | Lee | G01S 17/86 |
| 2020/0191942 | A1 * | 6/2020 | Han | G01S 13/931 |
| 2020/0210726 | A1 * | 7/2020 | Yang | G06V 10/25 |
| 2020/0219264 | A1 * | 7/2020 | Brunner | G01S 17/89 |
| 2020/0394824 | A1 * | 12/2020 | Kanzawa | G01S 17/86 |
| 2021/0110173 | A1 * | 4/2021 | Serafin | G06T 7/251 |
| 2022/0128702 | A1 * | 4/2022 | Ziglar | G01S 17/42 |
| 2022/0406010 | A1 * | 12/2022 | Radha | G01S 17/42 |

(Continued)

FOREIGN PATENT DOCUMENTS

| | | |
|---|---|---|
| CN | 103226833 B | 8/2015 |
| JP | 2009-204615 A | 9/2009 |

(Continued)

*Primary Examiner* — Logan M Kraft
*Assistant Examiner* — Sherman D Manley
(74) *Attorney, Agent, or Firm* — Morgan Lewis & Bockius LLP

(57) ABSTRACT

A method for estimating reliability of a bounding point of a track includes extracting bounding points from a track box of a target object, determining association between the bounding points and at least one LiDAR contour point based on a distance between the track box and the at least one LiDAR contour point, determining scores of the bounding points based on the association, and estimating reliability of the bounding points based on the scores of the bounding points.

20 Claims, 7 Drawing Sheets

(56) References Cited

U.S. PATENT DOCUMENTS

| | | | | |
|---|---|---|---|---|
| 2023/0184946 | A1* | 6/2023 | Yoo | G01S 17/58 356/28 |
| 2023/0351679 | A1* | 11/2023 | Serafin | G06T 17/00 |
| 2024/0005632 | A1* | 1/2024 | Ko | G06V 10/761 |
| 2024/0085527 | A1* | 3/2024 | Lee | G01S 17/89 |
| 2024/0142588 | A1* | 5/2024 | Alismail | G01S 17/89 |
| 2025/0102673 | A1* | 3/2025 | Park | G01S 17/931 |
| 2025/0200958 | A1* | 6/2025 | Cha | G01S 13/931 |

FOREIGN PATENT DOCUMENTS

| | | | |
|---|---|---|---|
| JP | 2020-534617 | A | 11/2020 |
| KR | 10-1921071 | B1 | 11/2018 |
| KR | 10-2021-0026412 | A | 3/2021 |

* cited by examiner

METHOD AND SYSTEM FOR ESTIMATING RELIABILITY OF BOUNDING POINT OF TRACK

CROSS-REFERENCE TO RELATED APPLICATION

The present application claims priority to Korean Patent Application No. 10-2022-0115447, filed on Sep. 14, 2022, the entire contents of which is incorporated herein for all purposes by this reference.

BACKGROUND OF THE PRESENT DISCLOSURE

Field of the Present Disclosure

The present disclosure relates to a method and system for estimating the reliability of a bounding point of a track.

Description of Related Art

Recently, as an application environment for autonomous driving of a vehicle has become more advanced, an accuracy for determining a shape of an object is required together with the presence or absence of the object.

However, generally, only an object detection, tracking, and/or classification technique focusing on the presence of the object rather than the shape of the object has been applied to the vehicle.

For example, according to the related art, a location of the object is predicted based on a midpoint of a rear bumper of the object, a size of the object is predicted through class information, and a heading direction of the object is predicted in a direction of a velocity vector.

A length, a width, and/or a heading angle of a track (also referred to as a track box) with respect to an object predicted through the related art may be inaccurate.

Accordingly, the presence of an object may be reliable according to the related art, but it is difficult to ensure a response to a cut-in and/or a cut-out of the object and an accuracy (and/or reliability) of a position at which the object may collide with the object for lane placement.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure may be directed to providing a method and a system for estimating reliability of a bounding point of a track of an object around a vehicle configured for improving shape estimation performance for the object.

The estimation of the reliability in an exemplary embodiment of the present disclosure may be based on association between the bonding points of the track and a Light Detection and Ranging (LiDAR) contour information.

According to various exemplary embodiments of the present disclosure, a method for estimating reliability of a bounding point of a track includes extracting bounding points from a track box of a target object, determining association between the bounding points and at least one LiDAR contour point based on a distance between the track box and the at least one LiDAR contour point, determining scores of the bounding points based on the association, and estimating reliability of the bounding points based on the scores of the bounding points.

In at least an exemplary embodiment of the present disclosure, the bounding points are located at respective corners and centers of sides of the track box.

In at least an exemplary embodiment of the present disclosure, the bounding points are extracted based on a width or a length of the track box, a heading angle of the track box, and location information of a first bounding point predetermined for the track box.

In at least an exemplary embodiment of the present disclosure, the determining of the association includes generating an equation of a first straight line for a side of the track box, determining a minimum distance between the at least one LiDAR contour point and the first straight line based on the equation of the first straight line, and determining an intersection between a second straight line perpendicular to the side of the track box and passing through the at least one LiDAR contour point and the first straight line when the minimum distance is less than or equal to a predetermined distance threshold.

In at least an exemplary embodiment of the present disclosure, the determining of the scores of the bounding points includes determining a zone in which the intersection is located, based on distances between the intersection and two bounding points located on the side, and determining a score of one of the two bounding points which is related to the zone with a predetermined score which is predetermined for the zone.

In at least an exemplary embodiment of the present disclosure, the determining of the zone is performed based on a ratio of a distance between the two bounding points and a distance between one of the two bounding points and the intersection.

In at least an exemplary embodiment of the present disclosure, the zone includes a first zone of a first predetermined fraction of an entire zone between the two bounding points or a second zone of a second predetermined fraction of the entire zone without being overlapped with the first zone as associated with the two bounding points, wherein the first zone includes a zone associated with a first bounding point of the two bounding points and a zone associated with a second bounding point of the two bounding points and the first zone is preset to be matched with a first score, and the second zone is preset to be matched with a second score which is lower than the first score.

In at least an exemplary embodiment of the present disclosure, the estimating of the reliability of the bounding points includes resetting a score of a bounding point which is equal to or less than a first predetermined threshold score to 0.

In at least an exemplary embodiment of the present disclosure, the estimating of the reliability of the bounding points includes redetermining a score of a bounding point of a corner which is equal to or less than a second predetermined threshold score by an interpolation of scores of two bounding points which are located closest thereto.

In at least an exemplary embodiment of the present disclosure, the estimating of the reliability of the bounding points includes dividing the scores of the bounding points by a maximum score thereof.

According to an exemplary embodiment of the present disclosure, a system for estimating reliability of a bounding point of a track includes an interface configured to receive LiDAR data from a LiDAR sensor of a vehicle, and a processor configured to be electrically or communicatively connected to the interface, wherein the processor is further configured to extract bounding points from a track box of a target object, determine association between the bounding points and at least one LiDAR contour point based on a distance between the track box and the at least one LiDAR contour point, determine scores of the bounding points based on the association, and estimate reliability of the bounding points based on the scores of the bounding points.

In at least an exemplary embodiment of a system of the present disclosure, the bounding points are located at respective corners and centers of sides of the track box.

In at least an exemplary embodiment of a system of the present disclosure, the bounding points are extracted based on a width or a length of the track box, a heading angle of the track box, and location information of a first bounding point predetermined for the track box.

In at least an exemplary embodiment of a system of the present disclosure, the processor is further configured to generate an equation of a first straight line for a side of the track box, determine a minimum distance between the at least one LiDAR contour point and the first straight line based on the equation of the first straight line, and is configured to determine an intersection between a second straight line perpendicular to the side of the track box and passing through the at least one LiDAR contour point and the first straight line when the minimum distance is less than or equal to a predetermined distance threshold.

In at least an exemplary embodiment of a system of the present disclosure, the processor is further configured to determine a zone in which the intersection is located, based on distances between the intersection and two bounding points located on the side, and determine a score of one of the two bounding points which is related to the zone with a predetermined score which is predetermined for the zone.

In at least an exemplary embodiment of a system of the present disclosure, the processor is further configured to determine the zone based on a ratio of a distance between the two bounding points and a distance between one of the two bounding points and the intersection.

In at least an exemplary embodiment of a system of the present disclosure, the zone includes a first zone of a first predetermined fraction of an entire zone between the two bounding points or a second zone of a second predetermined fraction of the entire zone without being overlapped with the first zone as associated with the two bounding points, wherein the first zone includes a zone associated with a first bounding point of the two bounding points and a zone associated with a second bounding point of the two bounding points and the first zone is preset to be matched with a first score, and the second zone is preset to be matched with a second score which is lower than the first score.

In at least an exemplary embodiment of a system of the present disclosure, the processor is further configured to reset a score of a bounding point which is equal to or less than a first predetermined threshold score to 0.

In at least an exemplary embodiment of a system of the present disclosure, the processor is further configured to redetermine a score of a bounding point of a corner which is equal to or less than a second predetermined threshold score by an interpolation of scores of two bounding points which are located closest thereto.

In at least an exemplary embodiment of a system of the present disclosure, the processor is further configured to divide the scores of the bounding points by a maximum score thereof.

A method and a system for estimating reliability of a bounding point of a track according to an exemplary embodiment of the present disclosure may provide reliability information related to shape information of an object.

For example, an object detection system of a vehicle embodied by the method or the system described above may define a minimum guaranteed size of an object based on the reliability of the bounding points. For example, the system for detecting an object around a vehicle may be able to distinguish a reliable zone as associated with the object from other zone for the entire zone including the bounding points of a track based on the reliability estimated for all the bounding points, and accordingly determine a tracking point of the target object which may be provided as information for controlling driving of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
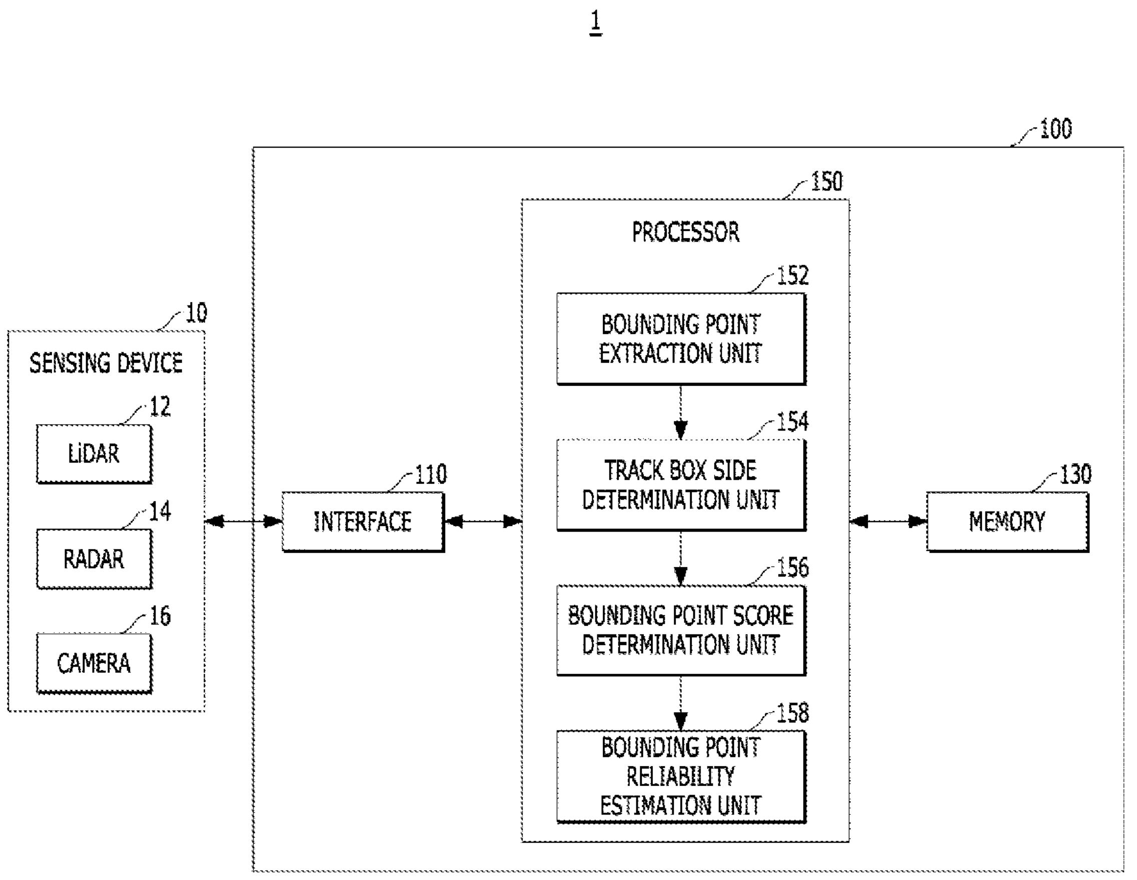
FIG. 1 is a block drawing of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In case where identical elements are included in various exemplary embodiments of the present disclosure, they will be provided the same reference numerals, and redundant description thereof will be omitted. In the following description, the terms “module” and “unit” for referring to elements are assigned and used interchangeably in consideration of convenience of explanation, and thus, the terms per se do not necessarily have different meanings or functions.

Furthermore, in describing the exemplary embodiments of the present disclosure, when it is determined that a detailed description of related publicly known technology may obscure the gist of the exemplary embodiments of the present disclosure, the detailed description thereof will be omitted. The accompanying drawings are used to help easily explain various technical features and it should be understood that the exemplary embodiments presented herein are not limited by the accompanying drawings. Accordingly, the present disclosure should be construed to extend to any alterations, equivalents and substitutes in addition to those which are set out in the accompanying drawings.

Although terms including ordinal numbers, such as “first”, “second”, etc., may be used herein to describe various elements, the elements are not limited by these terms. These terms are generally only used to distinguish one element from another.

When an element is referred to as being “coupled” or “connected” to another element, the element may be directly coupled or connected to the other element. However, it should be understood that another element may be present therebetween. In contrast, when an element is referred to as being “directly coupled” or “directly connected” to another element, it should be understood that there are no other elements therebetween.

A singular expression includes the plural form unless the context clearly dictates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

Unless otherwise defined, all terms including technical and scientific ones used herein include the same meanings as those commonly understood by one of ordinary skill in the art to which this invention belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Furthermore, the term “unit” or “control unit” included in the names of a hybrid control unit (HCU), a motor control unit (MCU), etc. is merely a widely used term for naming a controller configured for controlling a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

Hereinafter, operation principles and embodiments of the present disclosure will be described in reference to the accompanying drawings.

FIG. 1 is a block diagram of a vehicle according to an exemplary embodiment of the present disclosure.

FIG. 2A, FIG. 2B, FIG. 2C, and FIG. 2D, FIG. 3, FIG. 4, FIG. 5 and FIG. 6A, FIG. 6B, FIG. 6C, and FIG. 6D are diagrams for describing an operation of a system for estimating the reliability of a vehicle according to an exemplary embodiment of the present disclosure.

Referring to FIG. 1, a vehicle 1 may include a sensing device 10 and a system for estimating the reliability of a bounding point of a track box 100.

The sensing device 10 may include one or more devices configured for obtaining information on an object located around the vehicle 1, for example, information on the target vehicle.

The sensing device 10 may include a Light Detection and Ranging (LiDAR) 12, a radio detection and ranging (RADAR) 14, and/or a camera 16.

The LiDAR 12 may be one or plural, and may be mounted outside the main body of the vehicle 1 to generate LiDAR data, that is, point cloud data, by emitting a laser pulse toward the periphery of the vehicle 1.

The radar 14 may detect a peripheral object of the vehicle 1.

The camera 16 may obtain image data of the surroundings of the vehicle 1.

The system 100 may estimate reliability of bounding points of a track (also referred to as a track box), generated with respect to an object based on data received from the sensing device 10.

The system 100 may include an interface 110, a memory 130, and/or a processor 150.

The interface 110 may transmit an instruction or data input from a sensing device 10 or a user to another component of the system 100 to another device of the vehicle 1, i.e., another device of vehicle 1, or may output an instruction or data received from another component of the system 100.

The interface 110 may include a communication module to communicate with another device of the vehicle 1, for example, the sensing device 10.

For example, the communication module may include a communication module configured for performing communication between devices of the vehicle 1, for example, a controller zone network (CAN) communication and/or a Local Interconnect Network (LIN) communication, through a vehicle communication network. Furthermore, the communication module may include a wired communication module (e.g., a power line communication module) and/or a wireless communication module (e.g., a cellular communication module, a Wi-Fi communication module, a short-range wireless communication module, and/or a global navigation satellite system (GNSS) communication module).

The memory 130 may store various data used by at least one component of the system 100, for example, input data and/or output data for a software program and commands associated with the software program.

The memory 130 may include a nonvolatile memory such as a cache, a Read Only Memory (ROM), a Programmable ROM (PROM), an Erasable Programmable ROM (EPROM), an Electrically Erasable Programmable ROM (EEPROM), and/or a flash memory, and/or a volatile memory such as a Random Access Memory (RAM).

The processor 150 (also referred to as a control circuit or a control unit) may be configured for controlling at least one other component (i.e., a hardware component (i.e., the interface 110 and/or the memory 130) and/or a software component (i.e., a software program RAM)) of the system 100, and may perform various data processing and operations.

The processor 130 may be configured to generate a track in a form of a box for the object based on data received from the sensing device 10. The generation of the track may be performed by applying one of conventional track generation techniques. Hereinafter, a track may be referred to as a track box.

The processor 130 may extract contour points of the track box based on the LiDAR data received from the LiDAR 12. The contour points are outermost points of the object shape, and information including the contour points may be referred to as the contour. Extraction of contour points may be performed with one of the conventional contour point extraction unit techniques applied. Hereinafter, the contour point extracted based on the LiDAR data may be referred to as a LiDAR contour point.

Figures 2A, 2B, 2C, 2D:
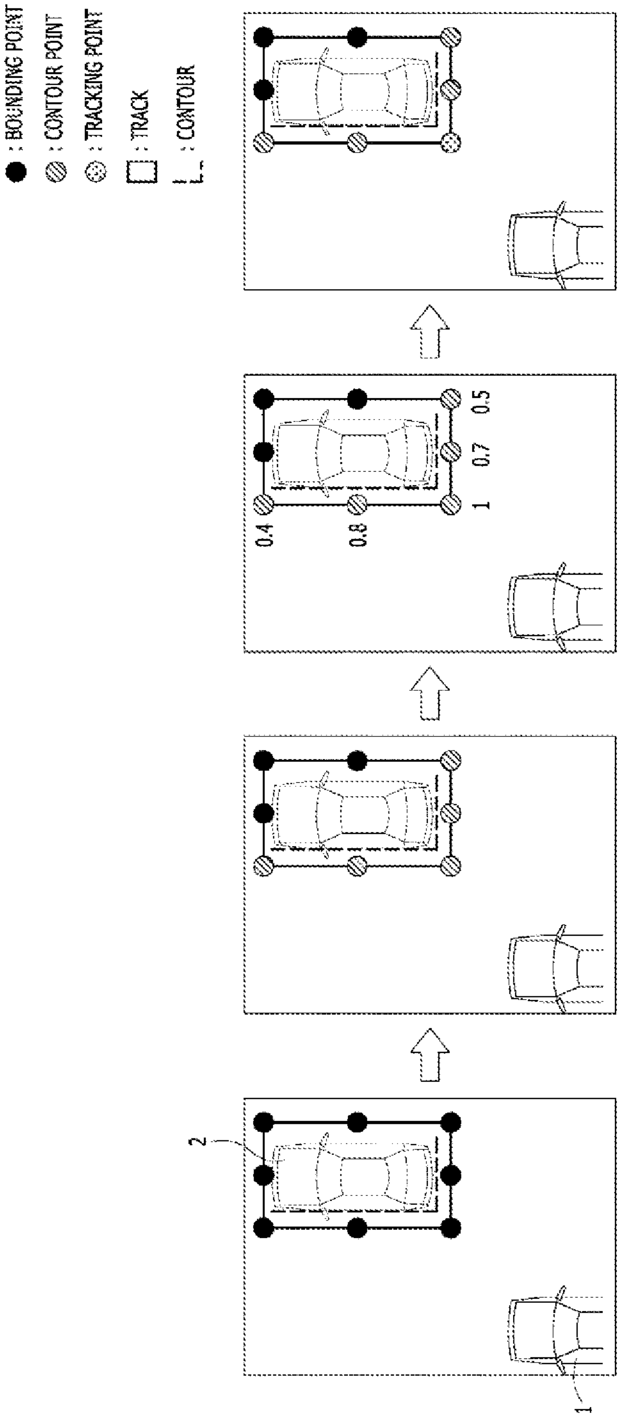
FIG. 2A, FIG. 2B, FIG. 2C, and FIG. 2D, FIG. 3, FIG. 4, FIG. 5 and FIG. 6A, FIG. 6B, FIG. 6C, and FIG. 6D are drawings illustrating an operation of a system for estimating the reliability of a vehicle according to an exemplary embodiment of the present disclosure.

Referring to FIG. 2A, the processor 130 may extract bounding points of a track box with respect to an object 2 located around the vehicle 1. As shown in FIG. 2A, the bounding points may be located at each corner of the track box and at a midpoint of each side of the track box.

Furthermore, referring to FIG. 2B, the processor 130 may be configured to determine the association between the LiDAR contour generated for the object and the bounding points extracted in FIG. 2A, that is, the association between the contour points and the bounding points.

The determination of the association between the LiDAR contour points and the bounding points may be performed to increase accuracy of estimation of the reliability of the bounding points in consideration of the fact that the LiDAR contour points are obtained based on the obtained LiDAR data by scanning the actual surface of the object by the LiDAR 12, and the reliability of the LiDAR contour points is higher than that of the output data of another sensing device.

Also, referring to FIG. 2C, the processor 130 may assign a score to each of the bounding points based on the association, and may estimate the reliability of each of the bounding points based on the score.

Also, referring to FIG. 2D the processor 130 may be configured to determine at least one of the bounding points as a tracking point for the object based on the reliability.

Referring back to FIG. 1, the processor 130 may include a bounding point extraction unit 152, a track box detection side determination unit 154, a bounding point score determination unit 156, and/or a bounding point reliability estimation unit 158.

The bounding point extraction unit 152 may extract bounding points of a track box generated with respect to an object located in the periphery of the vehicle 1.

The bounding point extraction unit 152 may extract the bounding points based on the location information of the first bounding point identified in advance of the track box, the width of the track box, the length of the track box, and/or the bending angle of the track box.

For example, a pre-identified first bounding point of the track box may include a highest reliability among points (i.e., points located at a midpoint between each corner of the track box and each side of the track box) extracted using one of the point extraction techniques according to the related art. For example, the pre-identified first bounding point of the track box may be a bounding point corresponding to the midpoint of the rear bumper of the target vehicle or a bounding point corresponding to a first edge portion of the target vehicle.

Furthermore, the width of the track box and the length of the track box may be predetermined information.

Furthermore, the heading angle of the track box may be determined through a conventional heading angle determination method.

When it is assumed that the n-th bounding point k−1 is identified in advance, the bounding point extraction unit 152 may extract the (n+1)-th bounding point k, that is, may determine (also referred to as an extraction) the location information of the (n+1)-th bounding point k through Equation 1 below based on the longitudinal coordinate value and the lateral coordinate value of the n-th bounding point k−1, which is the location information of the n-th bounding point k−1.

In an exemplary embodiment of the present disclosure, the number of bounding points may be a total of 8, and n (e.g., n=1, 2, 3, 4, 5, 6, 7, 8) and k (e.g., k=0, 1, 2, 3, 4, 5, 6, 7) may be integers. For example, assuming that the first bounding point 0 is identified in advance, the bounding point extraction unit 152 may be configured to determine the location information of the second bounding point 1 based on the location information of the first bounding point 0. Thereafter, the bounding point extraction unit 152 may be configured to determine location information of the third bounding point 2 based on the location information of the second bounding point 1, and then sequentially determine the location information of a fourth bounding point 3, a fifth bounding point 4, the sixth bounding point 5, the seventh bounding point 6, and the eighth bounding point 7 to extract the bounding points.

Figure 3:
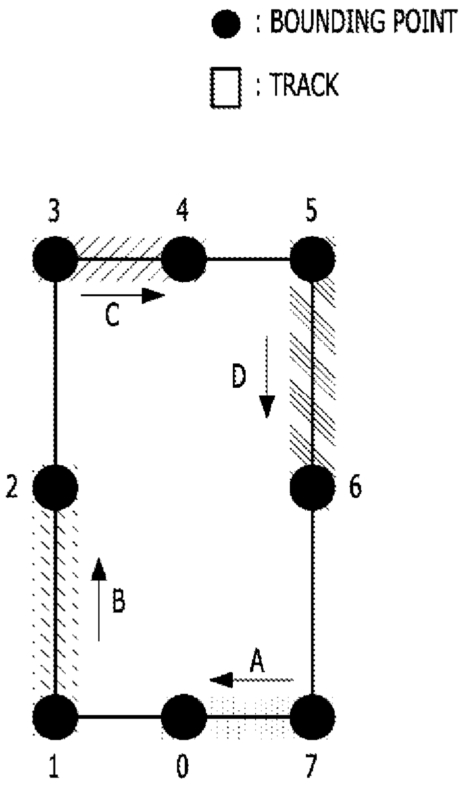

Referring to FIG. 3, the bounding point extraction unit 152 may be configured to determine location information of each of the bounding points, that is, a longitudinal coordinate value and a lateral coordinate value, using Equation 1 below.

$$A:\begin{cases}Pos_{long}[k] & = Pos_{long}[k-1]-(0.5\ W*\sin\theta)\\ Pos_{lat}[k] & = Pos_{lat}[k-1]+(0.5\ W*\cos\theta)\end{cases}$$

$$B:\begin{cases}Pos_{long}[k] & = Pos_{long}[k-1]+(0.5\ L*\cos\theta)\\ Pos_{lat}[k] & = Pos_{lat}[k-1]+(0.5\ L*\sin\theta)\end{cases}$$

$$C:\begin{cases}Pos_{long}[k] & = Pos_{long}[k-1]+(0.5\ W*\sin\theta)\\ Pos_{lat}[k] & = Pos_{lat}[k-1]-(0.5\ W*\cos\theta)\end{cases}$$

$$D:\begin{cases}Pos_{long}[k] & = Pos_{long}[k-1]-(0.5\ L*\cos\theta)\\ Pos_{lat}[k] & = Pos_{lat}[k-1]-(0.5\ L*\sin\theta)\end{cases},$$

Equation 1 wherein A denotes a first direction of a track box (e.g., a direction from an eighth bounding point 7 to a first bounding point 0), B a second direction of a track box (e.g., a direction from a second bounding point 1 side to a third bounding point 2 side), C a third direction of a track box (e.g., a direction from the fourth bounding point 3 to the fifth bounding point 4), D a fourth direction of a track box (e.g., a direction from a sixth bounding point 5 side to a seventh bounding point 6 side), $Pos_{long}$[k] a longitudinal coordinate value of a bounding point k in a corresponding direction (for example, a first direction A, a second direction B, a third direction C, or a fourth direction D), $Pos_{long}$[k−1] longitudinal coordinate values of a bounding point (k−1) in a corresponding direction, $Pos_{lat}$[k] a transverse coordinate value of a bounding point k, $Pos_{lat}$[k−1] a transverse left table value of a bounding point (k−1) in a corresponding direction, k a bounding point identification number (k is an integer (e.g., k=0, 1, 2, 3, 4, 5, 6, or 7)), W the width of a track box, L: the length of a track box, and 0 the heading angle of a track box.

In an exemplary embodiment of the present disclosure, when k=0, it may be previously designated as k−1=7.

For example, the bounding point extraction unit 152 may be configured to determine which one of A, B, C, and D of Equation 1 is to be applied based on the location information of the pre-identified one bounding point, and may be configured to determine location information of another bounding point using the determined equation. Thereafter, the bounding point extraction unit 152 may be configured to determine location information of all bounding points by determining which one of A, B, C, and D of Equation 1 is to be applied based on location information of another bounding point and determining location information of another bounding point through the determined equation.

For example, when it is assumed that the first bounding point 0 is identified in advance, the bounding point extraction unit 152 may be configured to determine A of Equation 1 based on the location information of the first bounding point 0, and may be configured to determine the location information A of the second bounding point 1 through A of Equation 1. Thereafter, the bounding point extraction unit 152 may be configured to determine B of Equation 1 based on the location information of the second bounding point 1, and may be configured to determine the location information of the third bounding point 1 through B of Equation 1. Thereafter, the bounding point extraction unit 152 may be configured to determine the location information of the fourth bounding point 3 through B of Equation 1, the location information of the fifth bounding point 4 through C of Equation 1, the location information of the sixth bounding point 5 through D of Equation 1, and the location information of the seventh bounding point 6 through D of Equation 1.

The track box detection side determination unit 154 may estimate the association between the LiDAR contour generated for the object, that is, the LiDAR contour points and the bounding points extracted by the bounding point extraction unit 152.

The track box detection side determination unit 154 may be configured to determine whether a side of the track box is a side detected based on the LiDAR data or a side predicted based on other data. For example, the track box detection side determination unit 154 may estimate a minimum distance between any side of the track box and each of the LiDAR contour points to determine whether the side of the track box is the side detected based on the LiDAR data.

For example, the track box detection side determination unit 154 may be configured to generate an equation of a straight line (also referred to as a first straight line) with respect to any side of the track box through a conventional linear equation generation equation such as Equation 2.

$$y = \frac{y_b - y_a}{x_b - x_a}x + c' \rightarrow ax + by + c = 0, \qquad \text{Equation 2}$$

wherein $y_a$ denotes a longitudinal coordinate value of a first bounding point a on any side (e.g., a first side) of the track box, $y_b$ a longitudinal coordinate value of a second bounding point b on the first side, xa a transverse coordinate value of the first bounding point (a) on the first side, $x_b$ a transverse coordinate value of the second bounding point (b) on the first side, $c'y_a-(y_b-y_a)/x_b-x_a)*x_a$, $a=y_b-y_a$, $b=x_b-x_a$, $c=(x_b-x_a)$ c'.

Furthermore, the track box detection side determination unit 154 may be configured to determine a minimum distance between each of the minimum of one LiDAR contour point and the first straight line.

Figure 4:
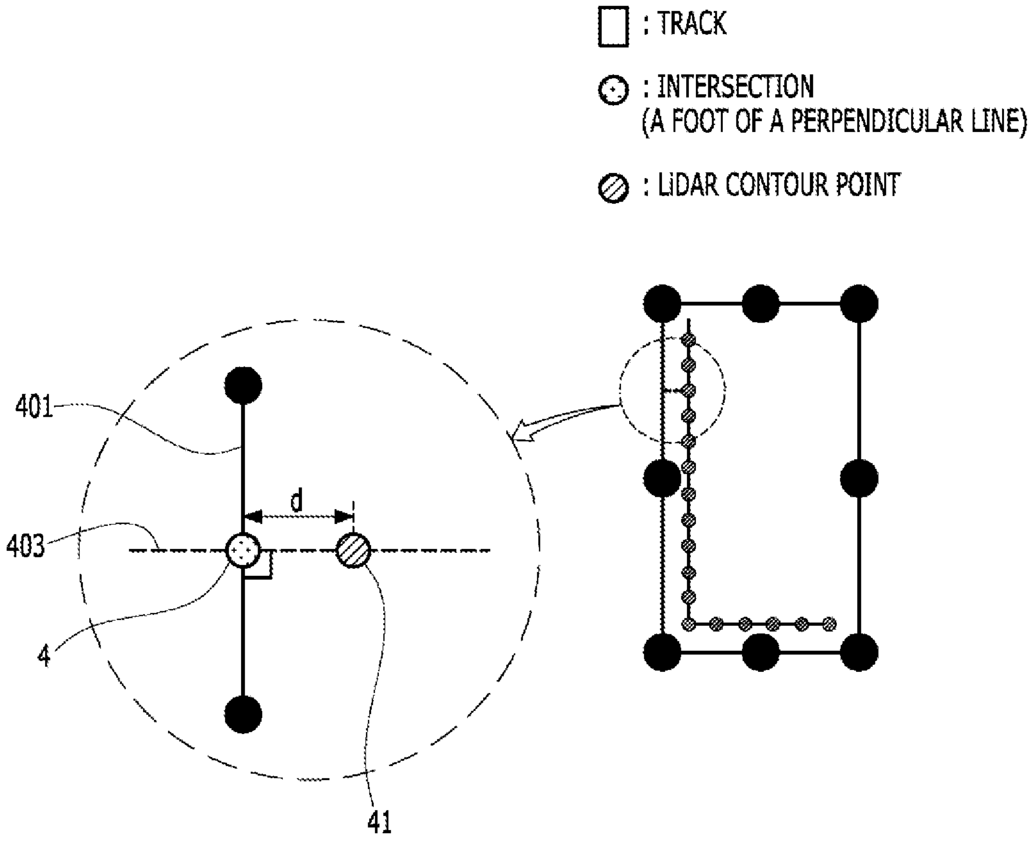

Referring to FIG. 4, the minimum distance d between the first LiDAR contour point 41 and the first straight line 401 may be determined by a distance formula between a conventional point and a straight line, for example, the following Equation 3.

$$d = \frac{|ax_c + by_c + c|}{\sqrt{a^2 + b^2}} \qquad \text{Equation 3}$$

wherein d denotes a minimum distance, a denotes a in Equation 2, b denotes b in Equation 2, c denotes c in Equation 2, $x_c$ denotes a transverse coordinate value of a first LiDAR contour point, and $y_c$ denotes a longitudinal coordinate value of the first LiDAR contour point.

Furthermore, the track box detection side determination unit 154 may be configured to determine whether a minimum distance between the minimum of one LiDAR contour point and the first straight line is within the predetermined distance threshold. When the minimum distance is within the predetermined distance threshold, the track box detection side determination unit 154 may be configured to determine the corresponding LiDAR contour point as a portion of a shape indicating any side of the above-described track box.

Referring to FIG. 4, the track box detection side determination unit 154 may be configured to determine the first LiDAR contour point 41 as a portion of a shape indicating any side of the track box when the minimum distance d between the first LiDAR contour point 41 and the first straight line 401 is equal to or less than the predetermined distance threshold. On the other hand, the track box detection side determination unit 154 may be configured to determine that the first LiDAR contour point 41 is not a portion of the shape indicating any side of the track box when the minimum distance d between the first LiDAR contour point 41 and the first straight line 401 exceeds the predetermined distance threshold.

Furthermore, when at least one LiDAR contour point is determined to be a portion of a shape indicating any side of the track box, the track box detection side determination unit 154 may estimate an intersection (also referred to as a foot of a perpendicular line) 4 between a straight line (a second straight line) which is perpendicular to any side and passes through each of the minimum of one LiDAR contour point and the above-described first straight line.

For example, the track box detection side determination unit 154 may be configured to determine the gradient B of the second straight line 403 based on the theory that the product of the slopes of two vertical straight lines is −1, that is, Equation 4 below, to estimate the intersection 4 between the second straight line 403, which is perpendicular to any side and passes through the first LiDAR contour point 41, and the first straight line 401.

$$\text{gradient}_B = -\frac{1}{\text{gradient}_A} \qquad \text{Equation 4}$$

wherein $\text{gradient}_B$ denotes a slope of a second straight line, and gradienta a slope of a first straight line.

Furthermore, the track box detection side determination unit 154 may be configured to determine OffsetB of the second straight line 403 through Equation 5 below.

$$\text{offset}_B = y_C - \text{gradient}_B * x_C \qquad \text{Equation 5:}$$

wherein OffsetB denotes offset of the second straight line, $\text{gradient}_B$ slope of the second straight line in Equation 4, $x_c$ transverse coordinate value of the first LiDAR contour point, and $y_c$ longitudinal coordinate value of the first LiDAR contour point.

Furthermore, the track box detection side determination unit 154 may estimate an intersection 4 between the first straight line 401 and the second straight line 403 as follows:

$$\text{intersection between } 1^{st} \text{ and } 2^{nd} \text{ straight lines} = \left(\frac{\text{offset}_B - \text{offset}_A}{\text{gradient}_A - \text{gradient}_B}, \text{gradient}_A * \frac{\text{offset}_B - \text{offset}_A}{\text{gradient}_A - \text{gradient}_B} + \text{offset}_A\right)$$

wherein Offsets denotes offset of a first straight line (C' in Equation 2), OffsetB offset of a second straight line, gradients slope of a first straight line, $\text{gradient}_B$ slope of the second straight line.

According to the above-described operations of the track box detection side determination unit 154, all intersections related to each of all LiDAR contour points generated for an object may be determined.

Referring back to FIG. 1, the bounding point score determination unit 156 may be configured to determine a similarity between the intersection and the bounding point, and may assign a score to each of the bounding points based on the similarity.

The bounding point score determination unit 156 may be configured to determine a bounding point associated with each intersection among three bounding points on a side of the track.

For example, the bounding point score determination unit 156 may identify two bounding points that are nearly adjacent to (or are closest to) each intersection, from among the three bounding points of any side thereof.

Also, with respect to an intersection, the bounding point score determination unit 156 may be configured to determine a first zone (also referred to as an occupied zone) extended from each of the two bounding points based on a first predetermined fraction of the entire zone between the two bounding points.

Also, the bounding point score determination unit 156 may be configured to determine a second zone (also referred to as a neutral zone) of a second predetermined fraction of the entire zone extended in the middle. The zones of the first zone and the second zone do not overlap each other.

Also, the bounding point score determination unit 156 may be configured to determine a zone in which each intersection belongs to, based on a ratio of a distance between the corresponding two bounding points and a distance between one of the two bounding points and the intersection. For example, a zone may be preset to be matched with each of predetermined ratios.

Figure 5:
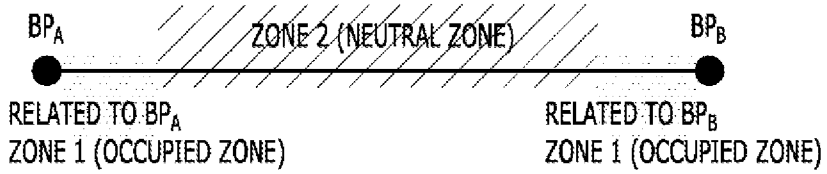

Referring to FIG. 5, taking it as an assumed example that an intersection is positioned between the first bounding point $BP_A$ and the second bounding point $BP_B$ among three bounding points existing on a side of a track box, the bounding point score determination unit 156 may be configured to determine zones of the first predetermined fraction around the first bounding point $BP_A$ and the second bounding point $BP_B$ as a first zone in the entire zone between the first bounding point $BP_A$ and the second bounding point $BP_B$.

Furthermore, the bounding point score determination unit 156 may determine, as a second zone, a zone of the second predetermined fraction of the entire zone between the first bounding point $BP_A$ and the second bounding point $BP_B$.

Also, the bounding point score determination unit 156 may be configured to determine a zone where the intersection is located, based on the predetermined conditions of the following:

$$V_{th1} \le \frac{dist(BP_A, \text{cross point})}{dist(BP_A, BP_B)} \le V_{th2} \rightarrow \text{first zone near } BP_A \text{ (occupied zone)}$$

$$V_{th2} < \frac{dist(BP_A, \text{cross point})}{dist(BP_A, BP_B)} < V_{th3} \rightarrow \text{second zone near (neutral zone)}$$

$$V_{th3} \le \frac{dist(BP_A, \text{cross point})}{dist(BP_A, BP_B)} < V_{th4} \rightarrow \text{first zone near } BP_B \text{ (occupied zone)}$$

wherein $BP_A$ denotes the first bounding point, $BP_B$ denotes the second bounding point, dist($BP_A$, $BP_B$) denotes the distance between $BP_A$ and $BP_B$, cross point denotes the intersection between $BP_A$ and $BP_B$, dist($BP_A$, cross point) denotes the distance between $BP_A$ and the intersection, dist($BP_B$, cross point) denotes the distance between $BP_B$ and the intersection, Vth1 denotes a first threshold value, Vth2 denotes a first threshold value, Vth3 denotes a first threshold value, and Vth4 denotes a first threshold value.

For example, the first predetermined fraction may be previously designated as 40% of the entire zone between the two bounding points, and the second predetermined fraction may be previously designated as 60% of the entire zone. Furthermore, the first threshold value may be designated as 0, the second threshold value may be designated as 0.2, the third threshold value may be designated as 0.8, and the fourth threshold value may be designated as 1.

Meanwhile, the score matching each section, i.e., each of the first zone and the second zone, may be predetermined.

Accordingly, the bounding point score determination unit 156 may assign a score to a bounding point related to a zone where each intersection is located, based on the predetermined score matched to each zone. When a plurality of scores are assigned to the same bounding point, the bounding point score determination unit 156 may be configured to determine a final score obtained by summing all of the plurality of scores as the score of the bounding point.

For example, assuming that 2 points are assigned to the first zone and 1 point is assigned to the second zone, when it is determined that an intersection is located in the first zone related to the first bounding point $BP_A$, the bounding point score determination unit 156 may assign 2 points to the first bounding point $BP_A$. When the intersection is determined to be located in the first zone related to the second bounding point $BP_B$, the bounding point score determination unit 156 may assign 2 points to the second bounding point $BP_B$. Furthermore, when it is determined that the intersection is located in the second zone, the bounding point score determination unit 156 may assign 1 point to each of the first bounding point $BP_A$ and the second bounding point $BP_B$.

Also, for example, when 2 points are assigned to the first bounding point $BP_A$ by a first intersection and 1 point is assigned to the first bounding point $BP_A$ by a second intersection, the bounding point score determination unit 156 may be configured to determine 3 points, which are obtained by adding the 2 points and the 1 point, as the final score of the first bounding point $BP_A$.

According to the above-described embodiment, after scores by all intersections are assigned to all of the bounding points and thus the final scores of the bounding points are determined, an operation of estimating reliability of the bounding points may be performed.

Referring back to FIG. 1, the bounding point reliability estimation unit 158 normalizes scores of bounding points which are equal to or greater than a predetermined score, and outputs reliability indexes of the bounding points. For example, the reliability indexes of the bounding points may be used to determine a tracking point of the object.

For example, the bounding point reliability estimation unit 158 may perform a validity check of the scores of the bounding points. The validation check may include identifying whether there is a bounding point whose score is smaller than or equal to a predetermined threshold score.

Furthermore, the bounding point reliability estimation unit 158 may finally reset a score to 0 which is equal to or smaller than the predetermined threshold score.

Furthermore, the bounding point reliability estimation unit 158 may correct the score of a bounding point which is identified (or searched) as needed to be corrected so.

According to a difference between the shape feature of a vehicle and the shape of the track box, a score (or a final score) of a bounding point corresponding to each corner of the track box may be smaller than a score of other bounding points of the track box.

Accordingly, the bounding point reliability estimation unit 158 may adjust the score of the bounding point at a corner by an interpolation with the scores of the two bounding points. For example, the bounding point reliability estimation unit 158 may be configured to determine the score of the corner bounding point by an interpolation with the scores of the nearest bounding points at both sides.

The bounding point reliability estimation unit 158 may normalize the scores of bounding points by the greatest one among the scores, and may utilize the normalized values as indexes of the reliability of the bounding points.

For example, the bounding point reliability estimation unit 158 may be configured to determine the reliability of each of the bounding points using Equation 6 below.

$$BP_n^{Confidence\ level} = \frac{BP_n^{Score}}{\max(BP_{All}^{Score})}, \quad \text{Equation 6}$$

wherein $$BP_n^{Confidence\ level}$$

denotes reliability of an n-th bounding point, n an index of the bounding point by an integer (n=1, 2, 3, 4, 5, 6, 7, 8), $$BP_n^{Score}$$

a score of an nth bounding point: a highest score among scores of bounding points.

When the density of LiDAR contour points is high, the scores of the bounding points may be determined to be overall high, and when the scores of the bounding points are normalized based on the total sum of the scores, the reliability of the bounding points may be too small, and therefore, the greatest score is used for the normalization.

Figure 6A:
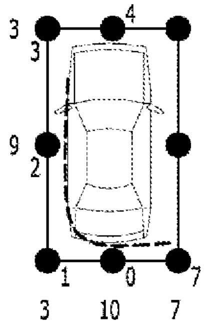

Referring to FIG. 6A, FIG. 6B, FIG. 6C, and FIG. 6D, according to the operation of the above-described bounding point score determination unit 156, as shown in FIG. 6A, when the eighth bounding point 7 has a score of 7 points, the first bounding point 0 has a score of 10 points, the second bounding point 1 has a score of 3 points, the third bounding point 2 has a score of 9 points, and the fourth bounding point 3 has a score of 3 points, the operation of estimating the reliability of the bounding points will be referred to as follows.

The bounding point reliability estimation unit 158 may identify that the scores of the second bounding point 1 and the fourth bounding point 3 are smaller than or equal to the predetermined threshold score (i.e., the first threshold score) according to the validity check of the scores of the bounding portions as shown in FIG. 6A.

Figure 6B:
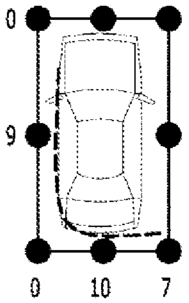
Figure 6C:
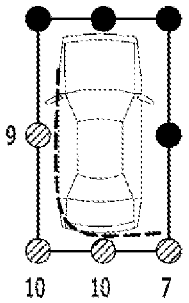

Accordingly, as shown in FIG. 6B, the bounding point reliability estimation unit 158 may initialize (or reset) the score of the second bounding point 1 and the score of the fourth bounding point 3 to 0.

Thereafter, the bounding point reliability estimation unit 158 may identify the second bounding point 1 as including the score equal to or smaller than the predetermined threshold score (i.e., the second threshold score) among bounding points of the corners in the score state of the bounding points as shown in FIG. 6B.

The bounding point reliability estimation unit 158 may redetermine the score of the second bounding point 1 by an interpolation. For example, the bounding point reliability estimation unit 158 may correct the score of the second bounding point 1 to 10, which is the same as the score of the first bounding point 0 which is the higher score among the scores of the first bounding point 0 and the third bounding point 2 which are immediately adjacent to the second bounding point 1.

Figure 6D:
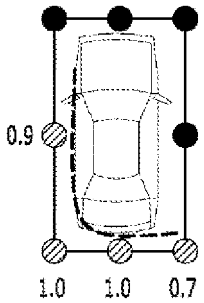

Thereafter, the bounding point reliability estimation unit 158 may be configured to determine and output as reliability of the bounding points the scores normalized by 10 points, which is the highest score among the scores of the bounding points, as shown in FIG. 6D. Referring to FIG. 6D, 0.7, 1.0, 1.0, and 0.9, which are result values obtained by dividing the score of each bounding point by 10, may be determined as indexes for reliability of the eighth bounding point 7, the first bounding point 0, the second bounding point 1, and the third bounding point 2.

Figure 7:
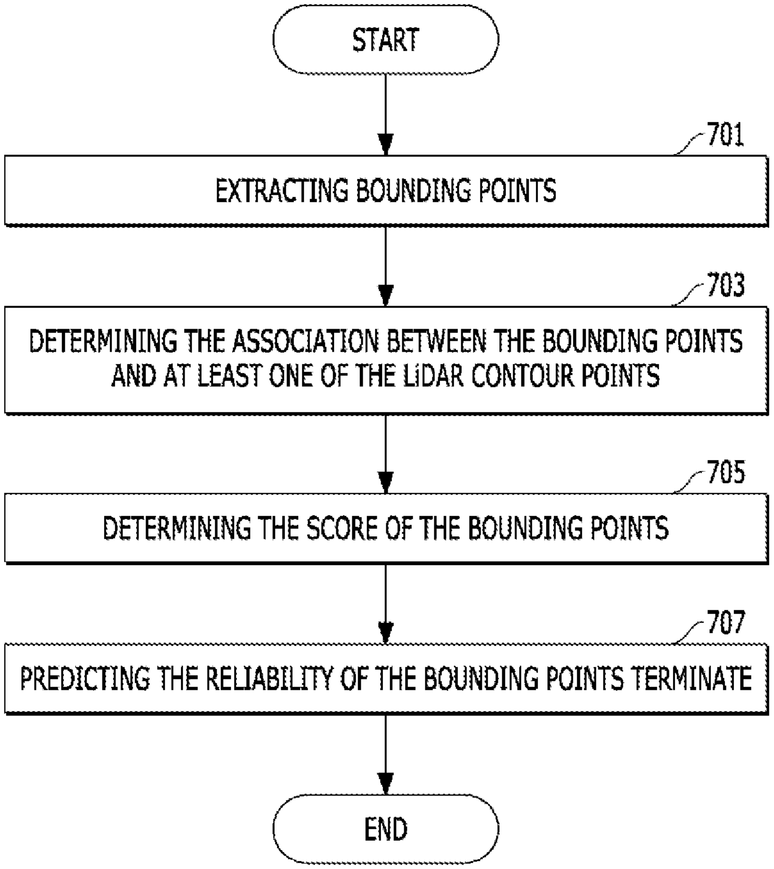
FIG. 7 is a flowchart illustrating an operation of a system for estimating the reliability of a vehicle according to an exemplary embodiment of the present disclosure.

FIG. 7 is a flowchart of an operation of the system 100 (and/or the processor 150) of the vehicle 1 according to an exemplary embodiment of the present disclosure.

The system 100 may extract the bounding points from the track box for the target object (701).

For example, the bounding points may be located at each corner of the track box and the midpoint of each side of the track box.

The reliability estimation system 100 may be configured to determine the association between the bounding points and at least one LiDAR contour point based on the distance between the track box and at least one LiDAR contour point (703).

For example, the system 100 may be configured to generate the equation of the first straight line for a side of the track box.

Also, the system 100 may be configured to determine the minimum distance between at least one LiDAR contour point and the first straight line based on the equation of the first straight line. Also, the system 100 may be configured to determine whether the minimum distance between a first LiDAR contour point and the first straight line is equal to or less than the predetermined distance threshold.

The determination of whether the minimum distance between the at least one LiDAR contour point and the first straight line is equal to or less than the predetermined distance threshold may be performed to determine whether the at least one LiDAR contour point is a portion of a shape indicating a side of the track box.

Only when the at least one LiDAR contour point is a portion of a shape indicating a side of the track box, the estimation of the reliability of the bounding points of the track box is meaningful. Accordingly, when the minimum distance between the at least one LiDAR contour point and the first straight line is equal to or less than the predetermined distance threshold, the system 100 may perform the below-described operations, and otherwise, may end the operation of the exemplary embodiment of the present disclosure.

When the minimum distance between the minimum of one LiDAR contour point and the first straight line is equal to or less than the predetermined distance threshold, the system 100 may be configured to determine an intersection between the first straight line and a second straight line which is perpendicular to the side of the track box and passes through at least one LiDAR contour point.

For example, the system 100 may be configured to determine an intersection for each and every LiDAR contour points.

For example, when the LiDAR contour points include a first LiDAR contour point and a second LiDAR contour point, the system 100 may be configured to determine the intersection between a second straight line perpendicular to a side of the track box and passing the first LiDAR contour point and the first straight line. Furthermore, the system 100 may be configured to determine the intersection between the first straight line and a second straight line perpendicular to a side of the track box and passing through the second LiDAR contour point.

The system 100 may be configured to determine the scores of the bounding points based on the association between the bounding points and at least one LiDAR contour point, i.e., a distance between the bounding points and the intersection for each of the LiDAR contour points (705).

The system 100 may be configured to determine a zone in which each intersection is located, that is, determine one of the first zone and the second zone as the zone in which each intersection is located, based on a distance between two bounding points located on a side of the track box among the bounding points and each determined intersection.

Also, the system 100 may be configured to determine the score of the bounding point associated with the determined zone by assigning the predetermined score of the determined zone to the bounding point associated with the determined zone among the two bounding points. For example, when a plurality of scores are assigned to one bounding point, the system 100 may be configured to determine a score obtained by summing all of the plurality of scores as the score of the bounding point.

For example, the first zones may correspond to the zones of the first predetermined fraction near two bounding points in the entire zone between the two bounding points located on a side thereof. When two bounding points are referred to as a first bounding point and a second bounding point, the first zones may include the zone associated with the first bounding point and the zone associated with the second bounding point.

Furthermore, the second zone may include the second zone which corresponds to a second predetermined fraction of the entire zone between two bounding points and is related to two bounding points. The first and second zones are not overlapped with each other.

For example, the system 100 may be configured to determine a zone in which each intersection is located, based on the ratio of the distance between two bounding points located on one side and a distance between any of the two bounding points and each intersection.

For example, the first zone may be previously designated to match a first score, the second zone may be previously designated to match a second score, and the second score may be higher than the first score.

The system 100 may estimate the reliability of the bounding points based on the scores of the bounding points (707).

The system 100 may initialize the score of the bounding point which is equal to or smaller than the first predetermined threshold score, from among bounding points having scores, to 0.

Also, the system 100 may interpolate (also referred to as correction) the score of the bounding point, which has a score equal to or smaller than the second predetermined threshold score and is located at a corner, from among the bounding points, based on scores of two closest bounding points.

Also, the system 100 may be configured to determine a value obtained by dividing a score of each of the bounding points by the maximum score among the scores of all the bounding points as the reliability of each of the bounding points.

According to the above-described embodiments, when an object is tracked based on the reliability of the bounding points in the object tracking filter, the accuracy and reliability of the shape of the object may be improved. For example, the object detection system of the vehicle 1 may thoroughly select the tracking point of the object even when the size information (the width and length) of the object is inaccurate.

Furthermore, according to the above-described embodiments, the reliability of the bounding points may be determined based on the LiDAR contour points that actually may be referred to as the detected surface of the object, and thus the bounding point at the position (the surface of the object which is most easily detected) of the object which is most likely to collide with the vehicle 1 (or a vehicle) may have a high reliability. For example, it is possible to improve the reliability of location information of a collision point between the vehicle 1 and an object which may collide.

Also, based on the reliability of the bounding points estimated according to the above-described embodiments, the object detection system of the vehicle 1 may be configured to determine a bounding point having the highest reliability as the tracking point of the object. Furthermore, in the above-described embodiments, the object detection system of the vehicle 1 may track the location of the object through a part having the highest possibility of collision, that is, a part having high reliability of the bounding point, and may positively affect the determination of the possibility of collision between the vehicle 1 and the object and the driving control of the vehicle 1.

Furthermore, according to the above-described embodiments, all of the bounding points of the track box with respect to the object may be tracked, and it may be possible to forcibly cope with some occlusion of the object and a change in a contour location according to a change in a location of the object. For example, even when the bounding point determined as the tracking point is hidden and the tracking point of the object is changed, the other bounding points are all tracked, and thus the present disclosure is reliable, and the detected shape change of the object may be minimized.

The above-described embodiments may be implemented in the form of a recording medium for storing instructions executable by a computer. The instructions may be stored in the form of a program code, and when executed by a processor (e.g., computer, microprocessor, CPU, ASIC, circuitry, logic circuits, etc.), may be configured to generate a program module to perform operations of the disclosed exemplary embodiments of the present disclosure. The recording medium may be implemented as a computer-readable recording medium.

The computer-readable recording medium includes all types of recording media in which computer-readable instructions are stored. For example, there may be a Read Only Memory (ROM), a Random Access Memory (RAM), a magnetic tape, a magnetic disk, a flash memory, an optical data storage device, etc.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless particularly stated otherwise, a singular form may also include a plural form. The expression "at least one (or one or more) of A, B, and C" may include one or more of all combinations that may be made by combining A, B, and C.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for estimating reliability of a bounding point of a track, the method comprising:

extracting, by a processor, bounding points from a boundary of a track box of a target object, wherein the track box is determined based on sensing data of the target object by a sensing device and the bounding points are positioned on the boundary of the track box;

determining, by the processor, association between the bounding points and at least one LiDAR contour point based on a distance between the track box and the at least one LiDAR contour point;

determining, by the processor, scores of the bounding points based on the association; and estimating, by the processor, reliability of the bounding points based on the scores of the bounding points.

2. The method of claim 1, wherein the bounding points are located at respective corners and centers of sides of the track box.

3. The method of claim 2, wherein the bounding points are extracted based on a width or a length of the track box, a heading angle of the track box, and location information of a first bounding point predetermined for the track box.

4. The method of claim 1, wherein the determining of the association includes:

generating an equation of a first straight line for a side of the track box;

determining a minimum distance between the at least one LiDAR contour point and the first straight line based on the equation of the first straight line; and determining an intersection between a second straight line perpendicular to the side of the track box and passing through the at least one LiDAR contour point and the first straight line when the minimum distance is less than or equal to a predetermined distance threshold.

5. The method of claim 4, wherein the determining of the scores of the bounding points includes:

determining a zone in which the intersection is located, based on distances between the intersection and two bounding points located on the side; and determining a score of one of the two bounding points which is related to the zone with a predetermined score which is predetermined for the zone.

6. The method of claim 5, wherein the determining of the zone is performed based on a ratio of a distance between the two bounding points and a distance between one of the two bounding points and the intersection.

7. The method of claim 6, wherein the zone includes a first zone of a first predetermined fraction of an entire zone between the two bounding points or a second zone of a second predetermined fraction of the entire zone without being overlapped with the first zone as associated with the two bounding points, wherein the first zone includes a zone associated with a first bounding point of the two bounding points and a zone associated with a second bounding point of the two bounding points and the first zone is preset to be matched with a first score, and the second zone is preset to be matched with a second score which is lower than the first score.

8. The method of claim 1, wherein the estimating of the reliability of the bounding points includes resetting a score of a bounding point which is equal to or less than a first predetermined threshold score to 0.

9. The method of claim 8, wherein the estimating of the reliability of the bounding points includes redetermining a score of a bounding point of a corner which is equal to or less than a second predetermined threshold score by an interpolation of scores of two bounding points which are located closest thereto.

10. The method of claim 1, wherein the estimating of the reliability of the bounding points includes dividing the scores of the bounding points by a maximum score thereof.

11. A system for estimating reliability of a bounding point of a track, the system comprising:

an interface configured to receive LiDAR data from a Light Detection and Ranging (LiDAR) sensor of a vehicle; and a processor configured to be electrically or communicatively connected to the interface, wherein the processor is further configured to:

extract bounding points from a boundary of a track box of a target object, wherein the track box is determined based on sensing data of the target object by a sensing device and the bounding points are positioned on the boundary of the track box, determine association between the bounding points and at least one LiDAR contour point based on a distance between the track box and the at least one LiDAR contour point, determine scores of the bounding points based on the association, and estimate reliability of the bounding points based on the scores of the bounding points.

12. The system of claim 11, wherein the bounding points are located at respective corners and centers of sides of the track box.

13. The system of claim 12, wherein the bounding points are extracted based on a width or a length of the track box, a heading angle of the track box, and location information of a first bounding point predetermined for the track box.

14. The system of claim 11, wherein the processor is further configured to:

generate an equation of a first straight line for a side of the track box, determine a minimum distance between the at least one LiDAR contour point and the first straight line based on the equation of the first straight line, and determine an intersection between a second straight line perpendicular to the side of the track box and passing through the at least one LiDAR contour point and the first straight line when the minimum distance is less than or equal to a predetermined distance threshold.

15. The system of claim 14, wherein the processor is further configured to:

determine a zone in which the intersection is located, based on distances between the intersection and two bounding points located on the side, and determine a score of one of the two bounding points which is related to the zone with a predetermined score which is predetermined for the zone.

16. The system of claim 15, wherein the processor is further configured to determine the zone based on a ratio of a distance between the two bounding points and a distance between one of the two bounding points and the intersection.

17. The system of claim 16, wherein the zone includes a first zone of a first predetermined fraction of an entire zone between the two bounding points or a second zone of a second predetermined fraction of the entire zone without being overlapped with the first zone as associated with the two bounding points, wherein the first zone includes a zone associated with a first bounding point of the two bounding points and a zone associated with a second bounding point of the two bounding points and the first zone is preset to be matched with a first score, and the second zone is preset to be matched with a second score which is lower than the first score.

18. The system of claim 11, wherein the processor is further configured to reset a score of a bounding point which is equal to or less than a first predetermined threshold score to 0.

19. The system of claim 18, wherein the processor is further configured to redetermine a score of a bounding point of a corner which is equal to or less than a second predetermined threshold score by an interpolation of scores of two bounding points which are located closest thereto.

20. The system of claim 11, wherein the processor is further configured to divide the scores of the bounding points by a maximum score thereof.

* * * * *